(12) United States Patent
Boivie et al.

(10) Patent No.: US 6,981,032 B2
(45) Date of Patent: Dec. 27, 2005

(54) ENHANCED MULTICAST-BASED WEB SERVER

(75) Inventors: Richard H. Boivie, Monroe, CT (US); Nancy K. Feldman, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 09/917,088

(22) Filed: Jul. 27, 2001

(65) Prior Publication Data

US 2003/0023738 A1 Jan. 30, 2003

(51) Int. Cl.[7] .................. G06F 15/16; H04N 7/173
(52) U.S. Cl. .............. 709/219; 709/217; 709/218; 709/203; 725/97
(58) Field of Search ................ 709/200–206, 709/230, 232, 229, 217–226, 228, 245, 249; 370/390, 310, 444, 389, 395; 707/10; 725/97

(56) References Cited

U.S. PATENT DOCUMENTS

| | | | | |
|---|---|---|---|---|
| 5,612,959 A | * | 3/1997 | Takase et al. | 370/390 |
| 5,673,430 A | * | 9/1997 | Story | 725/116 |
| 5,751,960 A | * | 5/1998 | Matsunaga | 709/206 |
| 5,790,790 A | * | 8/1998 | Smith et al. | 709/206 |
| 5,838,912 A | * | 11/1998 | Poon et al. | 709/204 |
| 5,956,716 A | * | 9/1999 | Kenner et al. | 707/10 |
| 5,978,381 A | * | 11/1999 | Perlman et al. | 370/432 |
| 6,038,601 A | * | 3/2000 | Lambert et al. | 709/226 |
| 6,351,467 B1 | * | 2/2002 | Dillon | 370/432 |
| 6,359,902 B1 | * | 3/2002 | Putzolu | 370/466 |
| 6,370,571 B1 | * | 4/2002 | Medin, Jr. | 709/218 |
| 6,411,616 B1 | * | 6/2002 | Donahue et al. | 370/352 |
| 6,594,682 B2 | * | 7/2003 | Peterson et al. | 718/102 |
| 6,785,704 B1 | * | 8/2004 | McCanne | 718/105 |
| 6,801,936 B1 | * | 10/2004 | Diwan | 709/219 |
| 6,862,279 B1 | * | 3/2005 | Imai et al. | 370/390 |
| 2001/0003828 A1 | * | 6/2001 | Peterson et al. | 709/219 |
| 2002/0007374 A1 | * | 1/2002 | Marks et al. | 707/513 |
| 2002/0073167 A1 | * | 6/2002 | Powell et al. | 709/217 |
| 2004/0042479 A1 | * | 3/2004 | Epstein et al. | 370/432 |

\* cited by examiner

Primary Examiner—Saleh Najjar
Assistant Examiner—Asad Nawaz
(74) Attorney, Agent, or Firm—Casey P. August; Jose Gutman; Fleit, Kain, Gibbons, Gutman, Bongini & Bianco P.L.

(57) ABSTRACT

A method for distributing web content efficiently across a network preferably using multicast transmission techniques. An information server receives a first request for a portion of information from a first networked device. It then receives a second request for the portion of information from a second networked device. The information server collects the first request and the second request into a bucket. The information server creates a combined response, destined for reception by the first networked device and the second networked device, and then provides the combined response including the portion of information requested by both the first and second networked devices, to a network interface.

39 Claims, 6 Drawing Sheets

ENHANCED MULTICAST-BASED WEB SERVER

CROSS-REFERENCE TO RELATED APPLICATION

This application generally relates to the teachings of U.S. patent application Ser. No. 09/240,546, entitled "Reliable Multicast For Small Groups" filed on Jan. 29, 1999, and of U.S. patent application Ser. No. 09/240,549, entitled "Multicast Support For Small Groups", filed on Jan. 29, 1999, and of U.S. patent application Ser. No. 09/329,101, entitled "System For Multicast Communications In Packet Switched Networks", filed on Jun. 9, 1999, and of U.S. patent application Ser. No. 09/774,505, entitled "Method And System For Efficiently Delivering Content To Multiple Requesters", filed on Jan. 31, 2001, which are all assigned to the same assignee as the present patent application and the collective teachings of which are herein incorporated by reference.

BACKGROUND OF THE INVENTION

1. Field of the Invention

The invention generally relates to the field of delivering content to multiple requesters over a communications network. The invention particularly relates to efficient communication of responses to requests for content being processed by a web content server.

2. Description of Related Art

In a networked environment, a content server responds to requests for content from networked devices by sending responses to the networked devices. The responses comprise one or more packets of information that deliver the requested content to the requesting networked devices.

Over a time interval, many requesting networked devices can request the same content from the content server. For example, browsers on many networked personal computers may request download of a particular web page from a web site. In prior art web server systems, for example, 1000 requests for a particular web page may be received by a web server, and consequently 1000 responses with the same web page content will be sent out into the network destined for reception by the 1000 requesting networked devices. Unfortunately, this additional traffic for the same content consumes significant additional network bandwidth at many key distribution links across the network. Regrettably, this reduces overall network efficiency and detrimentally impacts the performance of an overall web server system. A main disadvantage with the prior art systems, therefore, is that a content server individually processes and responds to received requests one at a time even if these requests are for the same content.

Therefore a need exists to overcome the problems with the prior art as discussed above.

SUMMARY OF THE INVENTION

A system and method are provided for distributing web content efficiently across a network. A preferred embodiment of the present invention comprises a method in a content server that transmits web content via multicast transmission techniques. Optionally, the multicast transmission comprises a Small Group Multicast protocol. Also, the method includes the intelligent processing of requests for content from networked devices. The method processes the requests to more efficiently deliver combined responses to requests for the same content from the destination networked devices.

DESCRIPTION OF THE PREFERRED EMBODIMENTS

The present invention, according to a preferred embodiment, overcomes problems with the prior art by using the information available to a content server while processing requests to more efficiently deliver combined responses to requests for the same content, as will be discussed in detail below. A computing system operating as a content server 102, according to a preferred embodiment of the present invention, utilizes the advantages of packet delivery by multicast transmission and preferably using a Small Group Multicast protocol to deliver combined responses to a plurality of requesting networked computing devices, as will be discussed below.

Figure 1:
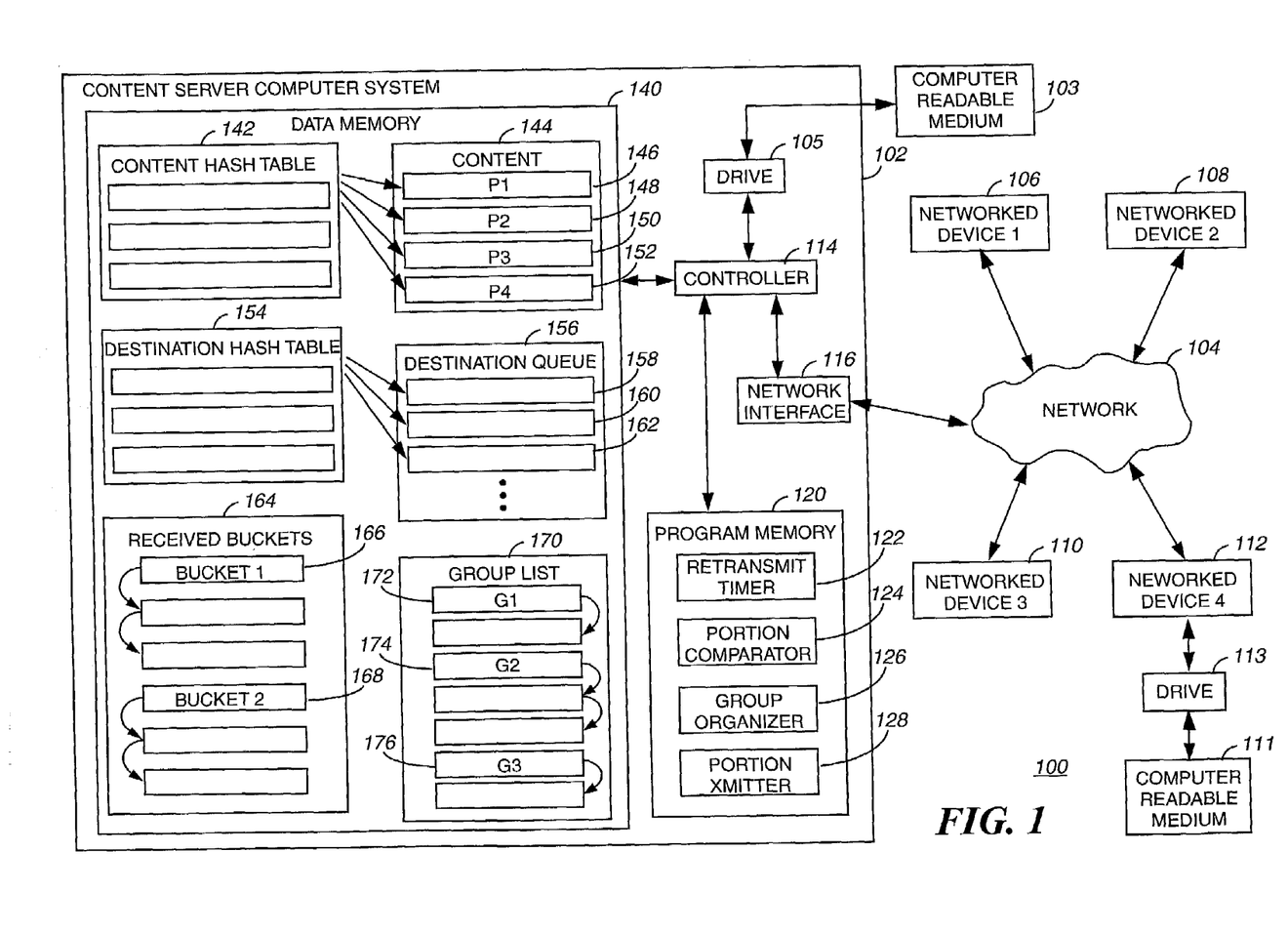
FIG. 1 is a block diagram of a computer network system according to a preferred embodiment of the present invention.

According to a preferred embodiment of the present invention, as shown in FIG. 1, an exemplary computer network system 100 includes a content server computer system 102 communicatively coupled to a network 104. The network 104 can comprise any one, or a combination of, a local area network and a wide area network, including wired and/or wireless communication. According to a preferred embodiment, the network 104 comprises a collection of wide area networks and local area networks, such as the Internet and the world wide web. The Ethernet protocol and TCP/IP protocol are commonly used in many such networks.

The network 104, in this example, is communicatively coupled to a first networked device 106, a second networked device 108, a third networked device 110, and a fourth networked device 112. The networked devices 106, 108, 110, 112 may comprise any of personal computers, DOS machines, WINDOWS machines, Macintosh machines, Linux machines, dumb terminals, cellular telephones, PDA's, and other terminal devices. FIG. 1 is merely illustrative of a simplified network topology and content server computer system 100. An actual network with which the present invention will be useful may include a multiplicity of network routers, numerous sub-networks, servers, and clients.

The content server computer system 102 preferably comprises a web server. A first computer readable medium 103 and drive 105, in this example, provide a means for transferring content and software to/from the server 102, such as for configuring it to carry out processes described below with reference to flow diagrams shown in the FIGs and that will be discussed below. The first computer readable medium 103 can for example take the form of an optical disk, a CD-ROM disk, a floppy disk, a tape cartridge, and the like. The content server computer system 102 includes a processor/controller 114, a network interface 116, a data memory 140, and a program memory 120. Note that the processor/controller 114 hereinafter may be interchangeably referred to as a processor, or a controller, or a processor/controller 114. The controller 114 is communicatively coupled to the data memory 140, the network interface 116, and the program memory 120. The controller 114 serves to control the overall operation of the content server computer system 102. The network interface 116 enables communication between the content server computer system 102 and the network 104. The controller 114 interoperating with the network interface 116 may act as a buffer and provide for an interface between the content server computer system 102 and the network 104. A second computer readable medium 111 is provided for loading software onto the networked device 4 112 via the drive 113, such as for configuring the networked device 4 112, for example, to carry out processes related to the operational flow sequence shown in FIG. 4. The network 104, in this illustration, is also communicatively coupled to networked device 1 106, networked device 2 108, and networked device 3 110. In this particular illustration, each of the networked device 1 106, networked device 2 108, and networked device 3 110 can, for example, comprise an IBM PC compatible computer system equipped with browser software for communicating with a content server via the network 104 such as via the Internet and the world wide web.

The controller 114 is communicatively coupled to a data memory 140. The data memory 140, in this example, stores content in a content memory 144. Additionally note that content might be stored on a disk, such as the computer readable medium 103, and then brought into the content memory 144 to be used by the system 100 as needed. In the present example, the content is organized in portions of content memory 144, such as illustrated by a first portion 146, a second portion 148, a third portion 150, and a fourth portion 152. Information in a hash table 142, in this example, is used to facilitate indexing into the content memory 144 to point to particular portions of the content stored in the content memory 144. Methods of using hash tables for indexing into information stored in a memory are well known to those of ordinary skill in the art. This storage and organization of content is merely illustrative and other data structures should be obvious to those of ordinary skill in the art in view of the present discussion.

Figure 5:
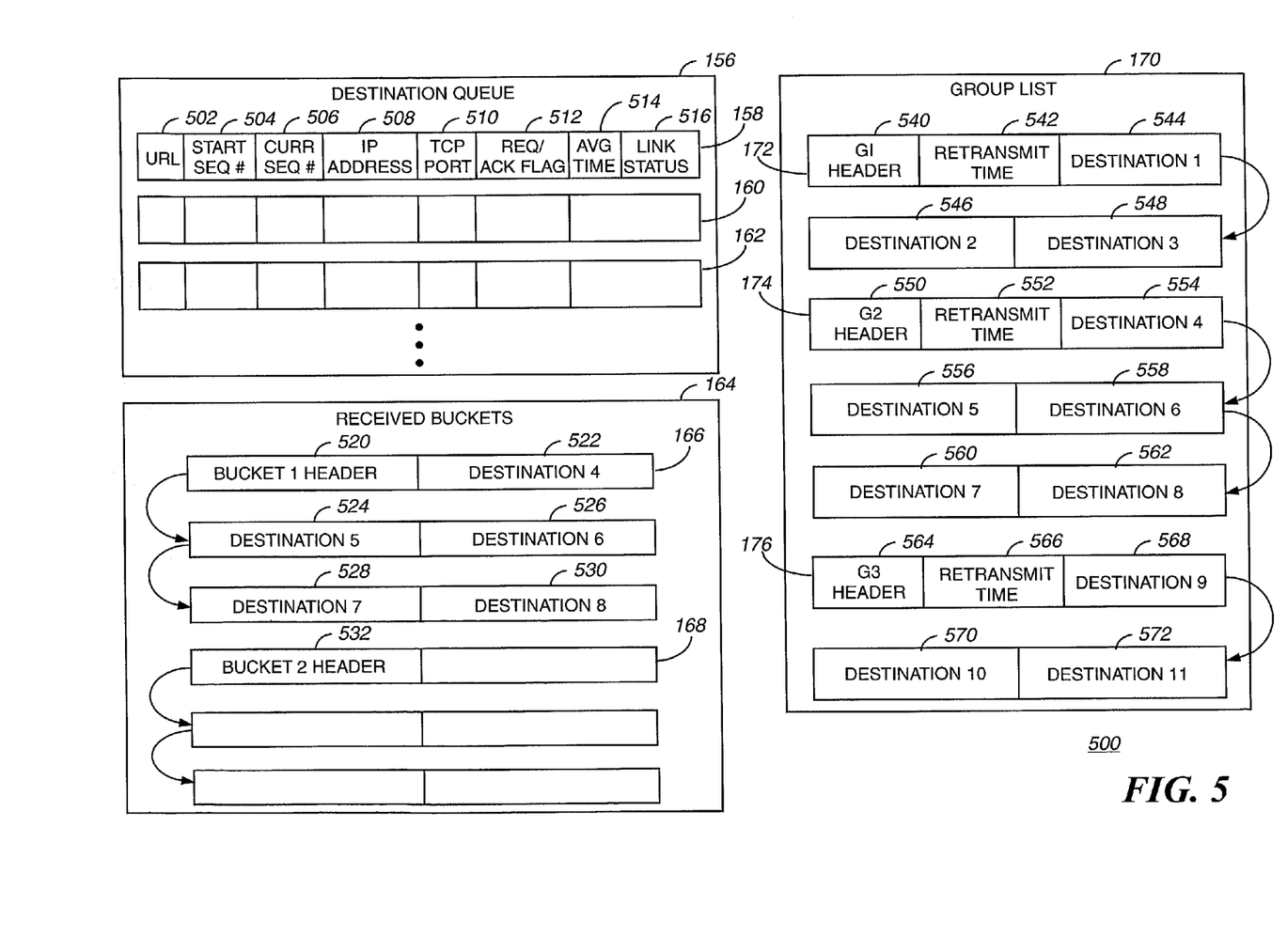
FIG. 5 is a block diagram illustrating a more detailed view of data structures contained in memory in FIG. 1, according to a preferred embodiment of the present invention.

FIG. 5 illustrates a more detailed view of data structures contained in the data memory 140 in FIG. 1. Specifically, the data structures are a destination queue 156, received buckets memory 164, and group lists memory 170, as will be more fully discussed below.

The destination queue 156 keeps track of destinations, e.g., networked devices 106, 108, 110, 112, on the network 104, by storing information associated with the particular content being sent and information associated with the specific destination networked devices 106, 108, 110, 112, receiving the content, as will be discussed in more detail below. As requests for content are received by the content server computer system 102, the server keeps track of each of the destinations for delivering content across the network 104 by storing a destination queue 156 that is indexed by a destination hash table 154.

In this example, requested content is identified by queue items, such as illustrated by a first queue item 158, a second queue item 160, and a third queue item 162, stored in the destination queue 156. For each queue item, for example see the first queue item 158 in FIGS. 1 and 5, a URL stored in the queue item 158 identifies a content being requested for the destination, e.g., the first networked device 106. Additionally, a start sequence number 504 and a current sequence number 506 point to portions of the content identified by the URL. The start sequence number 504 points to the first chunk or portion of the content, while the current sequence number points to the current chunk or portion of the content being sent to the destination such as to the first networked device 106. The destination, in this example, is identified by an IP address 508, and further identified by a TCP port 510. The TCP port 510 is used to identify a particular destination process at IP address 508. The TCP port 510 keeps track of multiple communications with the same destination identified by a single IP address 508. Additionally, a status flag named request/ACK flag 512 indicates the current status of a request for the portion of content for the destination. An average time delay 514 is a running average based on the measurement of the last three time delays between the server and destination device. The communication link status 516 indicates status o fa communication link with a particular destination. For example, after a link is established the status 516 may indicate that an initial communication has been established, or it may indicate that the link is in process of delivering portions of content to the destination in response to one or more requests for content, or it may indicate that a terminate link condition has been detected such as where the average time delay 514 exceeds a maximum permissible average time delay for the link.

The operation of the destination queue 156 can best be illustrated by example. For example, a first received request typically identifies the base URL for the requested content and the request is handled by the server 102 by creating a collection of received requests for the same content, if possible. The status flag would be initially set to "request" status to indicate that the destination is making an initial request for content from the server 102. As a second example, a received acknowledgement "ACK" message from a destination would indicate that both the previously sent portion of content was received by the destination, such as by the first networked device 106, and further that a next portion of content was being requested by the destination. In this case, the status flag would be set to "ACK" status to indicate that this destination is requesting a given portion of content from the server 102.

Another data structure in the data memory 140 is the received buckets memory 164. The content server computer system 102 keeps track of received requests for content by organizing the received requests in the received buckets memory 164. A bucket collects the destinations requesting a given portion of content. An initial request for content typically consists of a URL. But typically the requested content does not fit in a single packet so the initial response to a request for content typically contains only the initial portion of the requested content. When the requester receives this initial portion of content, it ACKs the initial transmission and requests additional content starting from the portion that has been successfully received. Thus a server 102 receives 2 types of requests: "initial" requests and ACK's that acknowledge a previous transmission and request the next portion of some content that doesn't fit in a single packet. And the server 102 has to deal with both types of requests and for each type, it needs to store multiple requests for a single piece of content into a single bucket.

Requests for subsequent portions of content comprise ACKs requesting additional portions of content. These subsequent requests are stored into buckets organized as collections of received requests for particular portions of content, such as indicated by bucket one 166 and by bucket two 168. Received requests for the same content are stored in the same bucket.

The operation of the received buckets memory 164 can best be illustrated by an example. For example, as shown in FIG. 5, bucket one 166 comprises a bucket one header 520 that includes system information associated with the bucket one 166, such as an identification of the bucket one 166 and system status information for bucket one 166. Additionally, the bucket one 166 comprises pointers to destinations that are collected into the bucket one 166 because these destinations are all requesting the same portion of content. In this example, destination four 522, destination five 524, destination six 526, destination seven 528, and destination eight 530, are collected into bucket one 166 because requests received from the destinations 4, 5, 6, 7 and 8, are all requesting the same portion of content from the server 102. Note that a bucket two 168 is also shown as a collection of requests for a same portion of content. The requests in bucket one 166 are typically requesting a different portion of content than the requests in bucket two 168.

Another data structure in the data memory 140 is the group list memory 170. Members of the same group have all requested and all been sent the same portion of content and have essentially the same transmit time. For example, if two destinations have dramatically different retransmit times, they would be placed into two different groups. The group list memory 170 contains at least zero groups of destinations that have been sent at least one portion of content requested by the destinations.

The operation of the group lists memory 170 can best be illustrated by an example. For example, as shown in FIGS. 1 and 5, the group list memory 170 contains group one 172, group two 174, and group three 176. Each group includes a group header 540, 550, 564, that stores system information associated with the particular group. Additionally, each group, in this example, includes a retransmit time 542, 552, and 566, which is the time when the server will retransmit the same portion of content to group members if acknowledgements have not been received. This retransmit time is typically a little longer than the round-trip time between the server and the destinations so that a retransmission is not triggered unless a packet (carrying content that has been transmitted or an acknowledgement) has been "lost".

Each group 172, 174, 176, includes a list of members of the group that represent destinations for receiving the current portion of content being delivered to the particular group 172, 174, 176. For example, the first group 172 includes group members for destination one 544, destination two 546, and destination three 548. The second group 174 includes group members for destination four 554, destination five 556, destination six 558, destination seven 560, and destination eight 562. The third group 176, furthermore, includes group members for destination nine 568, destination ten 570, and destination eleven 572. The members of each group, in this example, comprise pointers to the respective destinations in the destination queue 156. So, for example, the first group 172 comprises a first member 544 that points to the first queue item 158 stored in the destination queue 156. The first queue item 158, in this example, includes information associated with the first destination networked device 106 receiving the content.

Additionally, the controller 114 is communicatively coupled to program memory 120 (see FIG. 1). The program memory 120 includes computer instructions necessary to process within the content server computer system 102 the requests and responses for content. The program memory 120 contains functional modules for a retransmit timer 122, a portion comparator 124, a group organizer 126, and a portion transmitter 128, as will be discussed below.

The retransmit timer 122 keeps track of the retransmit time for each group in the group list memory 170. For each transmission of a portion of content to a group, the retransmit timer 122 monitors whether acknowledgements were received from every member of the group within the retransmit time for the group. If a retransmit time (e.g., m milliseconds) has been exceeded, the retransmit timer 122 flags the condition to indicate that a retransmit of the particular portion of content is needed for the members of the group. Each group, in this example, includes a retransmit time 542, 552, and 566, for keeping track of the time to retransmit the content to the members of a group if acknowledgements have not been received from the members. This retransmit time is typically set long enough (e.g. a little more than the round-trip time between the server and the destinations) so that a retransmission is not typically triggered unless one or more packets have actually been lost.

The content server 102 automatically adjusts retransmission times for particular destinations. Received buckets 164 are sorted into group lists 170 based on retransmit time. The server 102 determines which retransmission group 542, 552, 556 to assign the destination. First, a destination establishes a communication connection with the server and in the handshakes the server determines the initial total delay for transmissions from the server to an acknowledgement from the destination. The content server 102 then sets a retransmit time for the destination based on the initial handshake measurements. Then the server does a running average of the further handshakes going on between the server and the destination to maintain an approximate average delay time 514 for acknowledgements. The server develops a running average of the round trip time between the server and the destination by including in the running average the time delay between the time when a piece of content is transmitted by the server and when the server receives an acknowledgment of that piece of content from the destination.

Consider for example the method in which the server computes the average time delay 514. For example, the repeated measurements of three time delays (in a moving average) allows the server to estimate what retransmit group to put a destination in. The average time delay 514, in this example, is a moving average based on the last three measured time delays. Typically each destination handshakes information with the server 102 by replying with ACKS to acknowledge transmissions of packets received from the server 102. If the handshake indicates that the average time delay 514 is within 20 ms then the destination belongs in the 20 ms group.

Continuing this retransmission time example, suppose there are 20 ms, 40 ms, and 60 ms groups created for a portion of content being sent out. The server 102, in this example, is geographically located in the Atlanta, Ga., area. A handshake time delay to a remote destination in California, for example, takes much longer total delay than a handshake time delay to a local destination within Atlanta, Ga. If the total average time delay 514 is greater than 20 ms but less than 40 ms then the destination belongs in the 40 ms group. If the total average time delay 514 is greater than 40 ms but less than 60 ms then the destination belongs in the 60 ms group. This example is illustrated using only three retransmission groups. However, any number of retransmission groups or different retransmission ranges per group may be used depending on any particular application. For example, a connection utilizing a satellite communication link, such as along a path via a network 104, the roundtrip average time for communications should have a retransmission time of at least 250 msec. Continuing with the present example, if the total average time delay 514 is determined greater than some threshold then the delay is unacceptable and the server 102 determines that the communication link 516 has terminated between the server 102 and a particular destination device. The server 102 indicates that the communication link has terminated with a particular device. The server normally wants to quickly free up that communication resource for other client devices that would need to communicate with the server 102.

A portion comparator 124 compares requests from destinations and the system information associated with destinations in the destination queue 156 to determine whether a request (for a portion of content) from a first destination matches a request (for a portion of content) from a second destination. If these requests match then they may be collected into a bucket. Typically, as requests for portions of content are received by the server system 102, the portion comparator 124 compares the requests and the system information associated with the destinations for determining whether the two or more requests and associated destinations are requesting the same portion of content. As requests for portions of content are received they are matched with requests in buckets and then stored in the matching buckets. At the appropriate time for transmission of responses to requests for content, the portion transmitter 128, transmits a requested portion of content to all the members of each bucket.

A group organizer 126 handles organizing requests from the buckets and storing them into the groups 172, 174, 176, in the group list memory 170. The groups 172, 174, 176, represent groups of destination networked devices 106, 108, 110, 112, that are requesting the same portion of content and have essentially the same retransmit time. The groups are useful for tracking retransmission times for collections of destinations requesting the same portion of content.

The portion transmitter 128, transmits a requested portion of content to all the members of each bucket. This is handled very efficiently by sending the portion of content only once while attaching the addressing information and associated system information for each destination requesting the same portion of content. In this way, for example, a multicast message may serve to deliver the same portion of content to all requesting destination networked devices.

A preferred embodiment of the present invention intelligently "collects" received requests into buckets. Each bucket collects the destinations requesting the same portion of content. Received requests for the same content are stored in the same bucket. At the point where either a maximum number of received requests is exceeded or a maximum time is exceeded, the group organizer 126 will create groups of destinations in the group list memory 170 based on the collected destinations organized in the buckets. The portion transmitter 128 then transmits a single response to the destinations indicated in the buckets in response to a collection of requests requesting the same portion of content as indicated in each bucket. Buckets are used to collect similar requests and to transmit content in response to requests. These requests can include new URL requests, e.g., requesting a first portion of content, or ACK requests requesting an additional portion of content since ACKs comprise implicit requests for "more data", e.g., requesting an additional portion of content.

As previously mentioned, ACKs comprise implicit requests for "more data". The response to a request preferably includes a single copy of a portion of content coupled with address information for identifying the destinations that are members of the bucket requesting the same portion of content. This is preferably delivered across the network 104 via a multicast messaging mechanism.

At the point where either a maximum number of received requests is exceeded or a maximum time is exceeded, the server 102 collects the destinations requesting the same portion of content in the same buckets and the group organizer 126 creates groups of destinations in the group list memory 170 based on the collected destinations organized in the buckets. As previously mentioned, the members of the same group are all requesting the same portion of content and have essentially the same retransmit time. Groups can get defined/redefined when ACKs arrive or when "new" requests arrive. The portion transmitter 128 then transmits a response to a group of requests requesting the same portion of content as indicated in each group in the group list memory 170. The response preferably includes a single copy of a portion of content coupled with address information for identifying the destinations that are members of the group all requesting the same portion of content. This is preferably delivered across the network 104 via a multicast messaging mechanism. Buckets therefore are used to keep track of destinations to transmit responses to requesting destinations when the requests are received by the server, while groups are used to keep track of destinations to retransmit to a group of destinations if a retransmit time is exceeded. Note also that groups can get defined or redefined when ACKs arrive or when "new" requests arrive.

Note that each networked device 106, 108, 110, 112, as shown in FIG. 1, acknowledges (ACKs) responses sent by the content server computer system 102. Also, note that all ACKs may not arrive simultaneously at the content server computer system 102. So the destination queue 156 tracks the ACKs (the last sequence number successfully received) for each destination.

As discussed above, the group organizer 126 updates the destination queue items 158, 160, 162, in the destination queue 156 to collect destinations into groups based on similar retransmission times. In some cases, while collecting requests in buckets for transmission of a next portion of content, members of two previous groups of destinations may be determined to be receiving the same portion of content and have substantially the same retransmission time. In this case, the server 102 can create a new group that includes all of the requesting destinations (such as the previous members found in the two previous separate groups) into a single group receiving the same portion of content and having substantially the same retransmission time.

In other cases, the group organizer 126, by re-organizing groups based on received ACKs, will move destinations that are requesting a next portion of content to a new group that is different than a group for those destinations that are still requesting the current portion of content because the server 102 has not received their corresponding ACKs yet. By moving destinations from existing groups to new groups it allows the server 102 to handle requests for a next portion of content from destinations having a faster response time than other destinations in the previously existing groups.

This preferred embodiment of the invention relates to the efficiencies in web server capacity, throughput, and performance.

In summary, according to a preferred embodiment of the present invention, the following events may occur at a typical server 102.

1—requests for the same portion of content are collected as members in the same bucket. Sometimes those requests are the result of pulling destinations out of retransmission groups.

2—the server sends a response to the destinations in a bucket.

3—the server partitions buckets into groups based on measured round-trip times.

4—as ACKs arrive at the server 102, members of groups may be moved from existing groups and put into new buckets. The server 102 then proceeds as above in items 1, 2, and 3. The destinations in the new buckets may then be moved into new groups based on the retransmission time associated with the destination.

5—if the retransmit time is exceeded for a particular group before all the members in the group have ACKed back to the server 102, the server 102 retransmits to any remaining members of the group.

The portion transmitter 128 transmits into the network 104 the response to requests for the same content from networked devices. The response preferably is sent out using a multicast transmission technique such as comprising the Small Group Multicast (SGM) protocol such as described in U.S. patent application Ser. No. 09/240,549, entitled "Multicast Support For Small Groups", filed on Jan. 29, 1999, which is commonly owned and the entire teachings of which are hereby incorporated by reference.

Consider for example, the situation in which a "bucket" corresponds to a new request for a portion of content. The group organizer 126 will combine the packets into a single group and then the portion transmitter 128 will preferably use a multicast transmission, such as comprising a Small Group Multicast protocol, to send the first portion of content requested by the destinations in the group. A retransmit time 542, 552, 566, related to the particular group 172, 174, 176 is tracked by the retransmit timer 122. Groups are defined based on retransmit times for each destination. The retransmit time for a given destination is defined based on the observed round-trip time between the server and the destination.

Periodically, the retransmit timer 122 checks the retransmit times 542, 552, 566, for each group 172, 174, 176. If the retransmit time of a group has been exceeded, the portion transmitter 128 retransmits the response to that group and the server 102 assigns a new retransmit time 542, 552, 566, to the group 172, 174, 176. The retransmission of the portion of content for the members of the group is preferably handled using multicast transmission, such as comprising a Small Group Multicast protocol.

Figure 2:
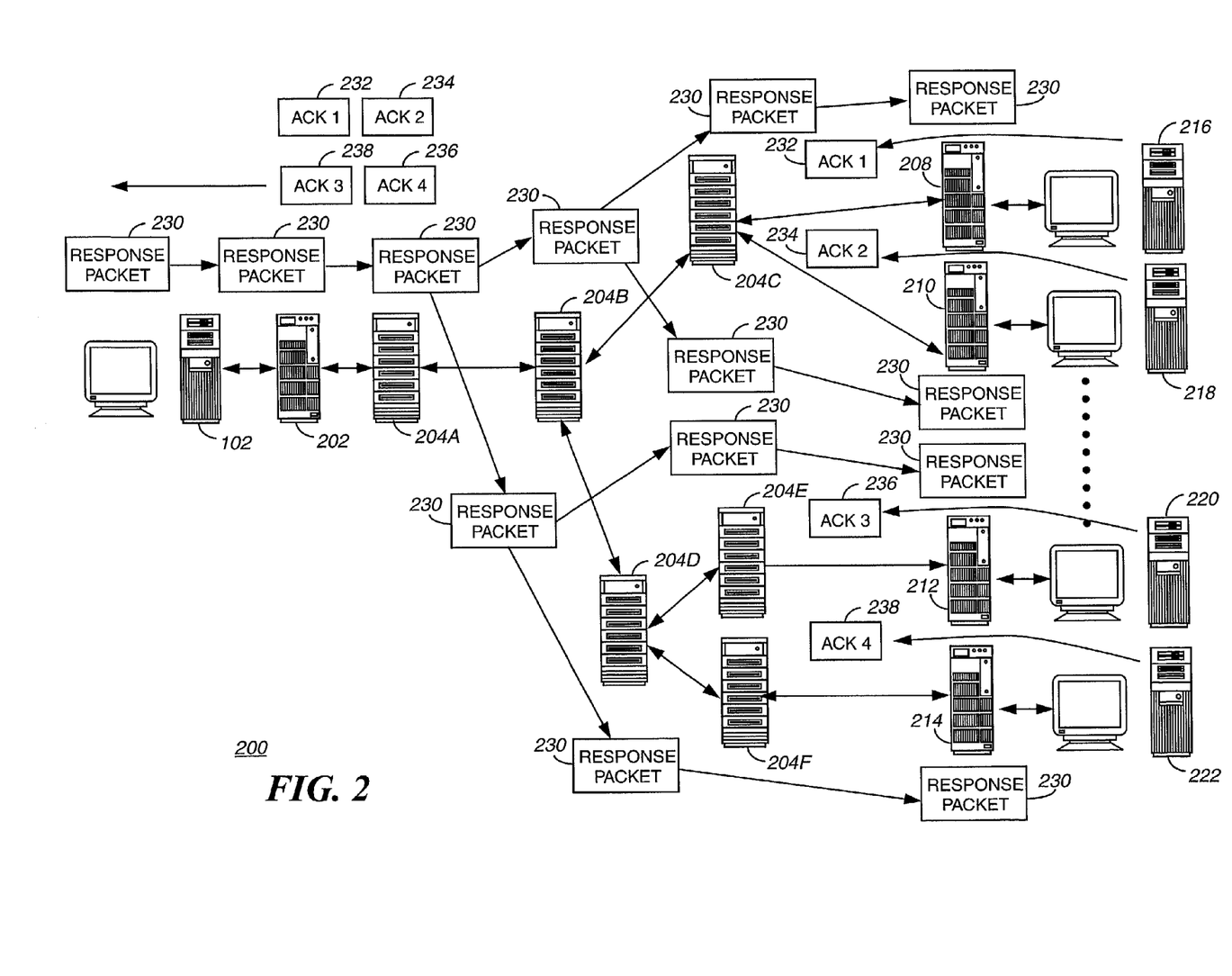
FIG. 2 is a block diagram illustrating a computer network system operating according to a preferred embodiment of the present invention.

FIG. 2 illustrates communications in a computer network system 200, according to a preferred embodiment of the present invention. The content server computer system 102, as previously shown in FIG. 1, communicates with a plurality of client machines 216, 218 . . . 220, 222, that may comprise personal computers, DOS machines, WINDOWS machines, Macintosh machines, Linux machines, dumb terminals, cellular telephones, PDA's, and other terminal devices. Client machines 216, 218 . . . 220, 222 may also be referred to herein as networked devices.

The client machines 216, 218 . . . 220, 222, via respective gateways 208, 210, 212, 214, communicate with the server 102 via the server gateway 202. Each client machine uses TCP/IP communication protocol to establish a communication session. To begin a TCP session, a "three-way handshake" establishes a connection between the source and destination, and synchronizes sequence numbers for the sending and receiving of data. After a connection is established, a client machine 216, 218 . . . 220, 222, transmits a request for content from the server 102. Many of the requesting network devices 216, 218 . . . 220, 222, may request the same content, and some may arrive at the server 202 at different times than others. To improve overall content server 102 efficiency and performance, the content server 202 will collect requests for the same portion of content to transmit a single common response packet 230 to deliver the same portion of content to all the destination requesting network devices 216, 218 . . . 220, 222 as long as these requests are "close" in time.

However, consider for example two separate requests for the same content arriving at the content server at different times. In order to prevent any delay in processing the first request, the content server will process the first and second request separately without combining them into a single common response packet. The content server 102 generates a common response 230 in response to requests for the same portion of content from networked devices 216, 218 . . . 220, 222 using a multicast transmission such comprising the Small Group Multicast (SGM) protocol such as described in U.S. patent application Ser. No. 09/240,549, entitled "Multicast Support For Small Groups", filed on Jan. 29, 1999, the entire teachings of which being hereby incorporated by reference. This common response 230 may be delivered across the network via one or more packets constituting the portion of content being requested by the destination devices 216, 218 . . . 220, 222. If the single common response 230 corresponds to a new request for content, a multicast messaging mechanism is used to send the first portion of the requested content to the destinations 216, 218 . . . 220, 222. If the single common response 230 corresponds to an acknowledgement (ACK) requesting an additional portion of content, preferably a multicast transmission such as comprising the SGM protocol is used to send the next portion of the requested content to the destinations 216, 218 . . . 220, 222, identified in the single common response 230 unless the entire content has been sent.

Each of the intermediate router nodes 204a and 204b typically includes a forwarding table to associate together those response packet addresses that have the same next hop address. After determining a "next hop" for this web content information, the router processor forwards a copy of the web content information, e.g., packets, to one or more other nodes in the network.

Once the networked devices receive the common response packet, each device returns an acknowledgement 232, 234, 236, 238, to the server 102. Note that an acknowledgement serves both to confirm successful delivery of the requested portion of content and also to request a next portion of content as long as there is more content to be sent. Many of the acknowledging network devices 216, 218 . . . 220, 222 may acknowledge the same data, and some may arrive at the server 202 at different times than others. Again, to improve overall content server efficiency and performance, the content server 102 will send a single portion of content in response to acknowledgements 232, 234, 236, 238 as long as those acknowledgement are received close to each other in time.

Figure 3:
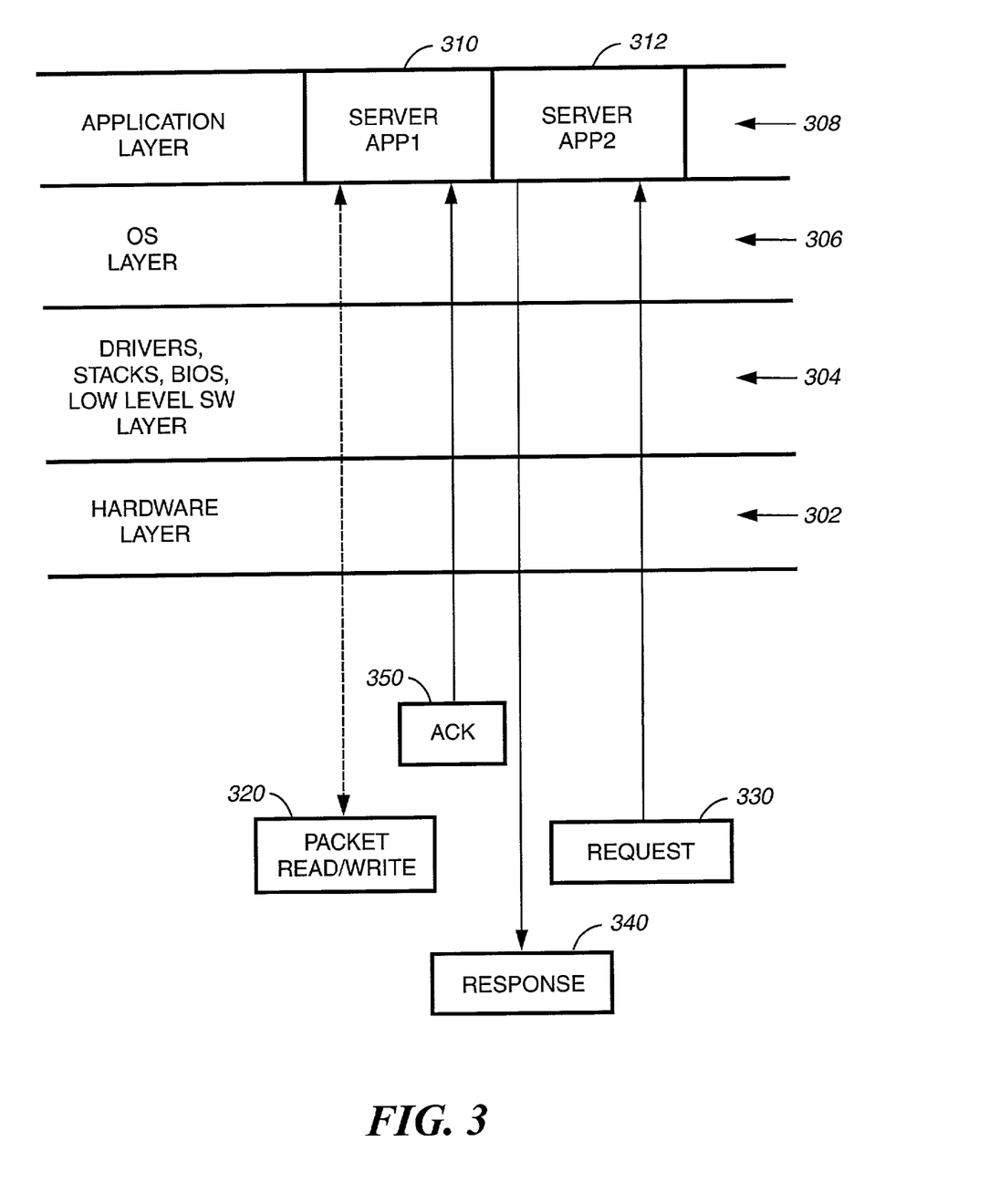
FIG. 3 is a schematic view of an exemplary communication sequence across a protocol stack in a computer network server according to a preferred embodiment of the present invention.

FIG. 3 illustrates exemplary communication sequences across a protocol stack in the content server computer system 102, according to a preferred embodiment of the present invention. The content server computer system 102 comprises a software platform including layers of software and hardware as will be discussed below.

The communication protocol stack, as shown, includes an HTTP server application layer 308 at the top of the stack. The HTTP server application layer 308 includes SERVER APP1 310 and SERVER APP2 312. These are independent applications, and/or application components, that operate on the server platform 102. A significant advantage of the present invention is that the invention, according to one preferred embodiment, directly supports high level communication with application components in the HTTP server application layer 308. The HTTP server application layer 308, as shown in the example of FIG. 3, is interfaced to an OS layer 306. The OS layer 306 is interfaced to a low-level SW layer 304. The low level SW layer 304 is interfaced to a hardware layer 302. In a preferred embodiment, the web server includes a protocol stack that supports multicast communication including the sending of multicast packets to a set of destinations as described above.

The portion of content being requested and then delivered to the requesting networked devices can be handled via packet read/writes 320 as shown. For example, TCP packets can be read and written at the network interface hardware through the layers of protocol stack and ultimately communicating with a high level server application such as the SERVER APP1 310 in the HTTP server application layer 308. The high-level server application, e.g., SERVER APP1 310 or SERVER APP2 312, communicates with remote networked devices using communication mechanisms such as the Requests 330, the ACKs 350, and the Responses 340.

Figure 4:
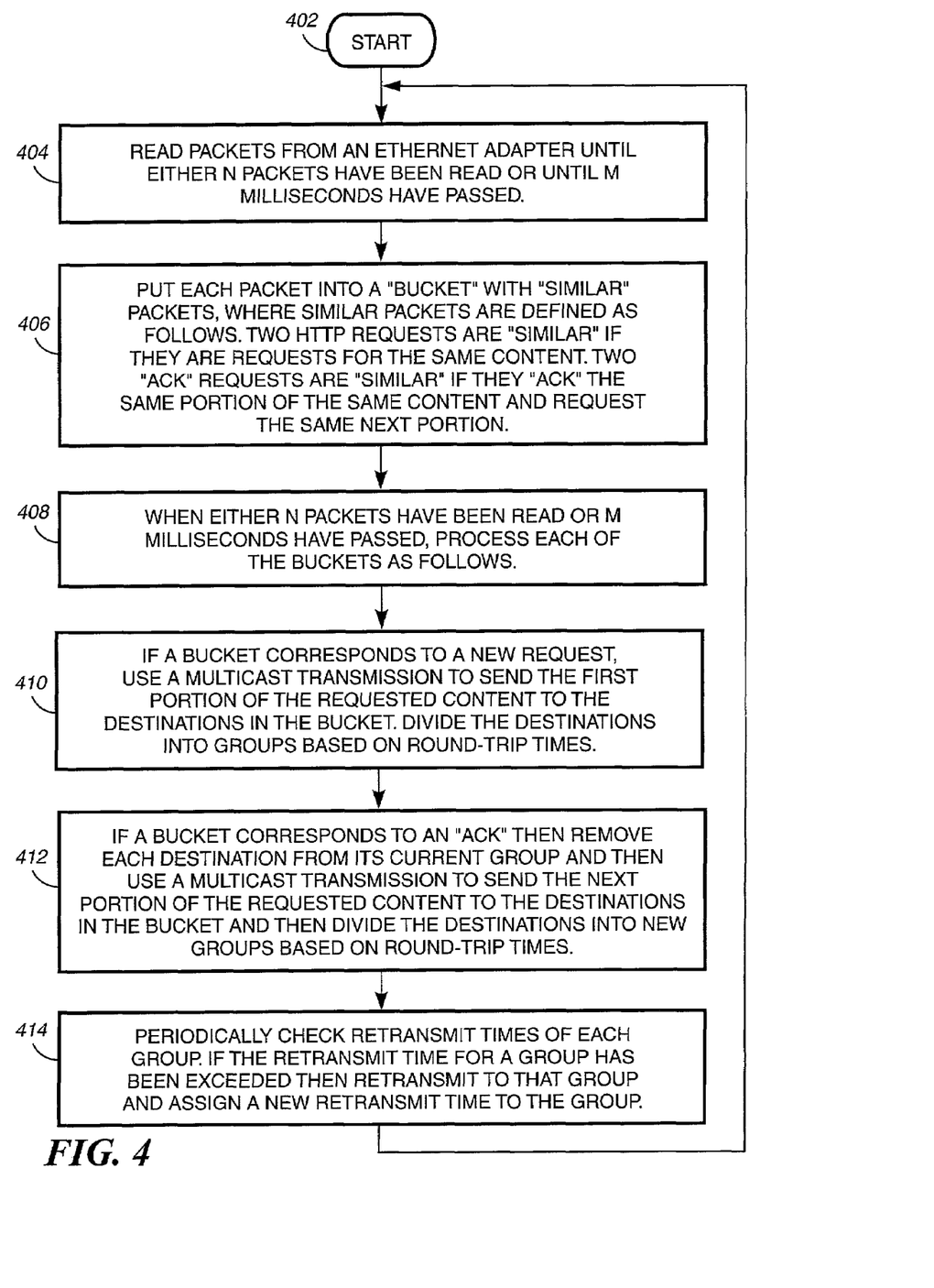
FIG. 4 is a flow diagram illustrating an operational sequence for a computer network server according to a preferred embodiment of the present invention.

FIG. 4 illustrates an operational sequence 400 of a content server computer system 102 according to a preferred embodiment of the invention. After entering the operational sequence 400, at step 402, a web content server computer system 102 as shown in FIG. 1, at step 404, reads packets from an Ethernet adapter until either n packets have been read or until m milliseconds have passed. The packets typically comprise http requests for a first portion of content, or the packets may comprise ACKs that are requesting a next portion of content. If neither the maximum request time nor maximum request queue is exceeded, then the server waits to receive additional requests.

At step 406, the server 102 puts each packet into a "bucket" with "similar" packets. Http requests are similar if they are requests for the same content. Two "ACK" packets are similar if implicitly they request the same portion of content.

In step 408, when either n packets have been read or m milliseconds have passed, the server 102 processes requests from a receive queue and arranges the requests into buckets, as has been discussed above.

Buckets are processed according to step 410. If a bucket corresponds to a new request, use a multicast transmission to send the first portion of the requested content to the destinations in the bucket. Divide the destinations into groups based on round-trip times. Optionally, the server 102 can use a multicast transmission comprising a Small Group Multicast protocol for sending the requested content to the destinations. A retransmit time is assigned to each of the groups.

At step 412, if a bucket corresponds to an "ACK" then remove each destination from its current group and then use a multicast transmission to send the next portion of the requested content to the destinations in the bucket, and then divide the destinations into new groups based on round-trip times. Optionally, the server 102 can use a multicast transmission comprising a Small Group Multicast protocol for sending the requested next portion of content to the destinations. A retransmit time is assigned to each of the groups.

Note that the server 102 effectively "moves" destinations from group to group based on retransmit times. Retransmit times are periodically updated by the server 102 for each destination.

At step 414, the server 102 periodically checks the retransmit time associated to each group. If the retransmit time of a group has been exceeded, the server 102 retransmits the same portion of content to all destinations that are members of that group and then the server 102 assigns a new retransmit time to the group.

Finally, at step 404, the server 102 continues to repeat the operational sequence.

Consider some examples for merely illustrative purposes. For example suppose the maximum time for reading packets before processing them is 3 msec. Suppose that the first request arrived at t=1 msec and the second request arrived at t=2 msec. Since both requests are within a 3 msec window, the server creates a combined response. On the other hand, suppose that the first request arrived at t=1 msec and the second request arrived at t=5 msec. In this case the arrivals are outside a 3 msec window, so each request is processed separately with a response created for each request. The combined response is distributed using a multicast transmission. The multicast transmission, according to a preferred embodiment of the present invention, utilizes the Small Group Multicast protocol such as described in U.S. patent application Ser. No. 09/240,549, entitled "Multicast Support For Small Groups", filed on Jan. 29, 1999, or using another mechanism for multicast.

Figure 6:
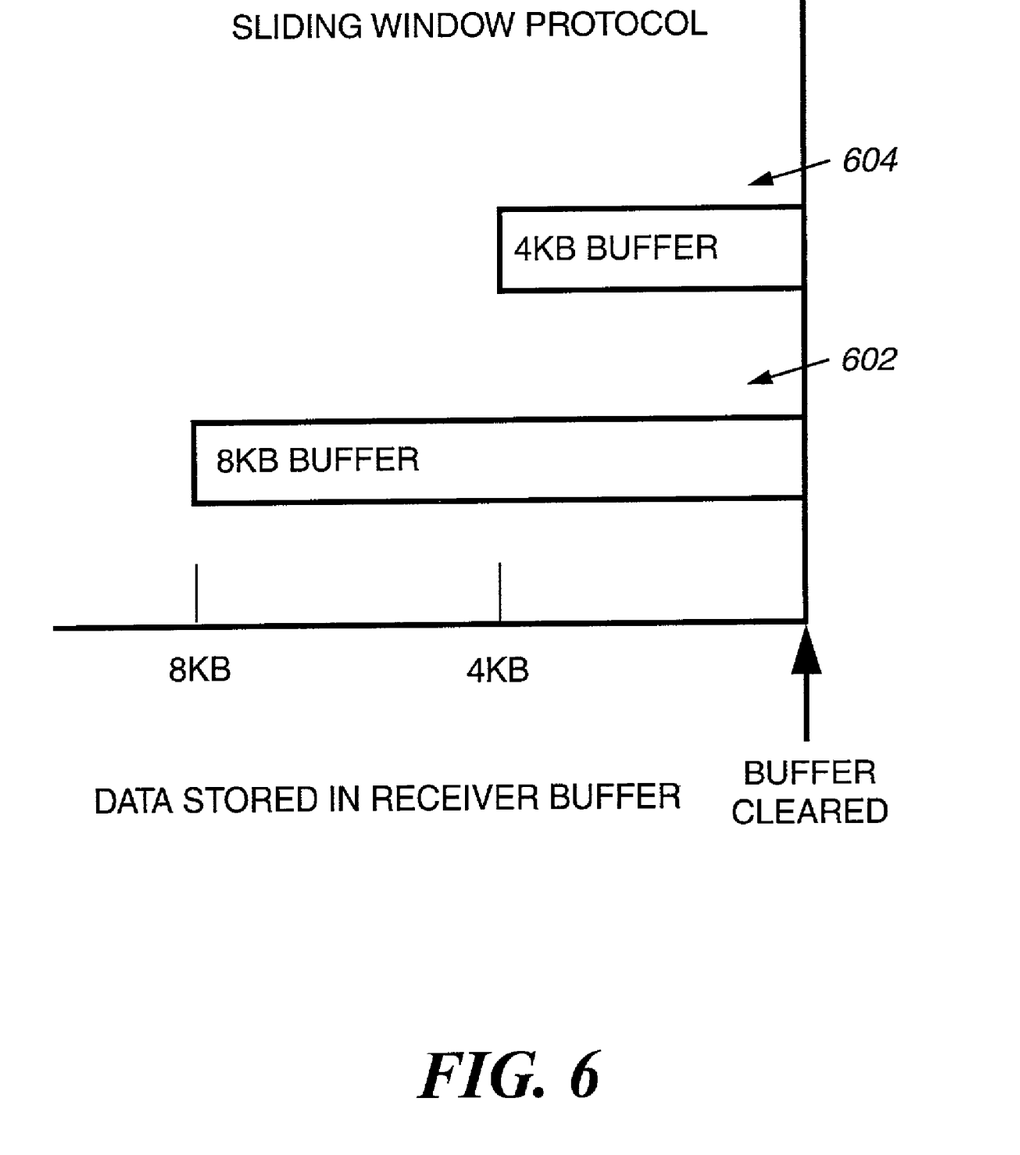
FIG. 6 is a block diagram illustrating a TCP sliding window protocol, according to a preferred embodiment of the present invention.

FIG. 6 illustrates a sliding TCP window protocol for the server 102. The sliding TCP window protocol is well known to those of ordinary skill in the art. Generally, the TCP window size determines how much data can be in transit between the server 102 and a particular destination device during a given time frame. Note that separate transmissions may, such as when the left end of the windows line up, be combined into a single bucket and served with a multicast transmission increasing the performance and efficiency of the web server 102 and the network 104.

As described above, a portion of content is sent to the destinations that are identified in a bucket because they are requesting the same portion of content. The server 102 delivers the portion of content to the destinations using one or more packets depending on the size of the TCP windows for the various destinations. For destinations with a larger TCP window, the server 102 will send more content than the destinations with a smaller TCP window.

As shown in FIG. 6, a sliding TCP window protocol allows the server 102 to transmit multiple packets to a destination before waiting for an acknowledgement from the destination. Each endpoint of a TCP connection will have a buffer (not shown) for storing data that is transmitted over the network 104.

According to an exemplary sliding TCP window protocol, an 8 KB buffer destination device 602 is in a group with a 4 KB buffer destination device 604. So, a first portion of content is sent as 4 KB to both destination devices 602, 604. The server 102 then can immediately follow with a second transmission of 4 KB to the 8 KB buffer device 602 because it has a larger buffer (larger TCP window). The server 102 tracks the available size of each destination device buffer. For example, an indication of the available size may be stored in the destination queue for each destination.

The 8 KB buffer device 602 may send to the server an ACK for the first 4 KB received (while the second 4 KB is being received) and then the server would be able to send the 8 KB buffer device 602 an additional 4 KB of content without an acknowledgment from the receiver that some or all of the data has been received. Once the acknowledgement for the remaining 8 KB is received, the TCP window slides further covering the next 8 KB, and so on.

This TCP window is "sliding" through the 8 KB buffer. Because a well-tuned sliding window protocol keeps the network completely saturated with packets, it obtains substantially higher throughput than a simple positive acknowledgement protocol. Increasing the window size increases the throughput, as a greater number of packets can be placed in the buffer unacknowledged.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium 103, 111, allowing a computer 102, 112, to read data, instructions, messages or message packets, and other computer readable information from the computer readable medium 103, 111. The computer readable medium 103, 111 may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium 103, 111 may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of delivering information to a plurality of networked devices, the method comprising the steps of:

receiving a first request from a first networked device, the first request requesting a first portion of information to be delivered to the first networked device as an ordinary unicast packet;

receiving a second request from a second networked device, the second request requesting a second portion of information to be delivered to the second networked device as an ordinary unicast packet, the second portion of information requested including an overlapping portion of information that overlaps the first portion of information requested by the first request;

collecting the first request and second request into a bucket; and creating a combined response in response to the first request from the first networked device and the second request from the second networked device, the combined response including the overlapping portion of information requested by the first and second networked devices, the overlapping portion of information destined for reception by the first networked device and by the second networked device, wherein the combined response comprises a multicast packet.

2. The method of claim 1, further comprising the step of providing the combined response including the overlapping portion of information to a network interface, the overlapping portion of information being destined for reception by the first and second networked devices.

3. The method of claim 1, wherein the combined response comprises at least one TCP packet destined for reception by the first and second networked devices.

4. The method of claim 3, wherein the least one TCP packet utilizes multicast transmission for transmitting the at least one packet to the first and second networked devices.

5. The method of claim 4, wherein the multicast transmission comprises a Small Group Multicast protocol.

6. The method of claim 1, wherein at least one of the first request and the second request comprises an acknowledgment (ACK) requesting a portion of information.

7. The method of claim 1, wherein at least one of the first request and the second request comprises an HTTP request requesting a portion of information.

8. The method of claim 7, wherein the HTTP request includes a URL to at least partially identify a requested portion of information.

9. The method of claim 1, further comprising the step of determining that a retransmit time associated with communication with the first networked device is substantially the same as a retransmit time associated with communication with the second networked device.

10. The method of claim 9, further comprising the step of retransmitting the overlapping portion of information to the first and second networked devices by using multicast transmission.

11. The method of claim 1, wherein the multicast packet comprises information for each of the first networked device and the second networked device, the information for creating a first unicast packet destined for reception by the first networked device and a second unicast packet destined for reception by the second networked device, and wherein each of the first unicast packet and the second unicast packet include at least the overlapping portion of information to be delivered to the first networked device and the second networked device, respectively.

12. A computer readable medium including computer instructions for an information serving system, the computer instructions comprising instructions for:

receiving a first request from a first networked device, the first request requesting a first portion of information to be delivered to the first networked device as an ordinary unicast packet;

receiving a second request from a second networked device, the second request requesting a second portion of information to be delivered to the second networked device as an ordinary unicast packet, the second portion of information requested including an overlapping portion of information that overlaps the first portion of information requested by the first request;

collecting the first request and second request into a bucket; and creating a combined response in response to the first request from the first networked device and the second request from the second networked device, the combined response including the overlapping portion of information requested by the first and second networked devices, the overlapping portion of information destined for reception by the first networked device and by the second networked device, wherein the combined response comprises a multicast packet.

13. The computer readable medium of claim 12, further including computer instructions for:

providing the combined response including the overlapping portion of information to a network interfaces, the overlapping portion of information being destined for reception by the first and second networked devices.

14. The computer readable medium of claim 13, wherein the combined response comprises at least one TCP packet destined for reception by the first and second networked devices.

15. The computer readable medium of claim 14, wherein the least one TCP packet utilizes multicast transmission for transmitting the at least one packet to the first and second networked devices.

16. The computer readable medium of claim 15, wherein the multicast transmission comprises a Small Group Multicast protocol.

17. The computer readable medium of claim 12, wherein at least one of the first request and the second request comprises an acknowledgment (ACK) requesting a portion of information.

18. The computer readable medium of claim 12, wherein at least one of the first request and the second request comprises an HTTP request requesting a portion of information.

19. The computer readable medium of claim 18, wherein the HTTP request includes a URL to at least partially identify a requested portion of information.

20. The computer readable medium of claim 12, further including computer instructions for:

determining that a retransmit time associated with communication with the first networked device is substantially the same as a retransmit time associated with communication with the second networked device.

21. The computer readable medium of claim 20, further including computer instructions for:

retransmitting the overlapping portion of information to the first and second networked devices by using multicast transmission.

22. An information serving system, comprising:

a plurality of networked devices including first and second networked devices; and an information server comprising:
a network interface for communication at least with the plurality of networked devices;
a controller communicatively coupled to the network interface;
a data memory for storing data including
content,
a first request corresponding to the first networked device, the first request requesting a first portion of the content to be delivered to the first network device as an ordinary unicast packet, and
a second request corresponding to the second networked device, the second request requesting a second portion of content to be delivered to the second networked device as an ordinary unicast packet, the second portion of content requested including an overlapping portion of content that overlaps the first portion of content requested by the first request; and
a program memory for storing computer program instructions for the controller, the computer instructions including instructions for
collecting the first request and second request into a bucket, and
creating a combined response in response to the first request from the first networked device and the second request from the second networked device the combined response including the overlapping portion of content requested by the first and second networked devices, the overlapping portion of content destined for reception by the first networked device and by the second networked device, wherein the combined response comprises a multicast packet.

23. The information serving system of claim 22, further comprising:

a portion transmitter, communicatively coupled to the controller, for providing the combined response including the overlapping portion of content to a network interface, the overlapping portion of content being destined for reception by the first and second networked devices.

24. The information serving system of claim 22, wherein the combined response comprises at least one TCP packet destined for reception by the first and second networked devices.

25. The information serving system of claim 24, wherein the least one TCP packet utilizes multicast transmission for transmitting the at least one packet to the first and second networked devices.

26. The information serving system of claim 25, wherein the multicast transmission comprises a Small Group Multicast protocol.

27. The information serving system of claim 22, wherein at least one of the first request and the second request comprises an acknowledgment (ACK) requesting a portion of information.

28. The information serving system of claim 22, wherein at least one of the first request and the second request comprises an HTTP request requesting a portion of information.

29. The information serving system of claim 28, wherein the HTTP request includes a URL to at least partially identify a requested portion of information.

30. The information serving system of claim 22, further comprising a retransmit timer, communicatively coupled to the controller, for determining that a retransmit time associated with communication with the first networked device is substantially the same as a retransmit time associated with communication with the second networked device.

31. The information serving system of claim 30, wherein the computer instructions further including instructions for:
retransmitting the overlapping portion of information to the first and second networked devices by using multicast transmission.

32. The information serving system of claim 31, wherein the multicast transmission comprises a Small Group Multicast protocol.

33. The information serving system of claim 22, wherein the multicast packet comprises information for each of the first networked device and the second networked device, the information for creating a first unicast packet destined for reception by the first networked device and a second unicast packet destined for reception by the second networked device, and wherein each of the first unicast packet and the second unicast packet include at least the overlapping portion of information to be delivered to the first networked device and the second networked device, respectively.

34. An information server, comprising:
a network interface for communication to first and second networked devices;
a controller communicatively coupled to the network interface;
a data memory for storing data including
content,
a first request corresponding to the first networked device, the first request requesting a first portion of the content to be delivered to the first networked device as an ordinary unicast packet, and
a second request corresponding to the second networked device, the second request requesting a second portion of content to be delivered to the second networked device as an ordinary unicast packet, the second portion of content requested including an overlapping portion of content that overlaps the first portion of content requested by the first request; and
a program memory for storing computer program instructions for the controller, the computer instructions including instructions for
collecting the first request and second request into a bucket, and
creating a combined response in response to the first request from the first networked device and the second request from the second networked device, the combined response including the overlapping portion of content requested by the first and second networked devices, the overlapping portion of content destined for reception by the first networked device and by the second networked device, wherein the combined response comprises a multicast packet.

35. The information server of claim 34, further comprising:
a portion transmitter, communicatively coupled to the controller, for providing the combined response including the overlapping portion of content to a network interface, the overlapping portion of content being destined for reception by the first and second networked devices.

36. The information server of claim 35, wherein the portion transmitter provides the combined response including the overlapping portion of content to the network interface for transmitting the combined response by using multicast transmission for delivering the overlapping portion of content to the first and second networked devices.

37. The information server of claim 34, further comprising a retransmit timer, communicatively coupled to the controller, for determining that a retransmit time associated with communication with the first networked device is substantially the same as a retransmit time associated with communication with the second networked device.

38. The information server of claim 37, wherein the computer instructions further including instructions for:
retransmitting the overlapping portion of content requested by the first and second networked devices by using multicast transmission for delivering the same portion of content to the first and second networked devices.

39. The information server of claim 38, wherein the multicast transmission comprises a Small Group Multicast protocol.

* * * * *